US010785482B2

(12) United States Patent
Zhou

(10) Patent No.: US 10,785,482 B2
(45) Date of Patent: Sep. 22, 2020

(54) METHOD AND SYSTEM FOR CONSTRAINING TILE PROCESSING OVERHEAD IN VIDEO CODING

(71) Applicant: Texas Instruments Incorporated, Dallas, TX (US)

(72) Inventor: Minhua Zhou, San Diego, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 157 days.

(21) Appl. No.: 14/013,296

(22) Filed: Aug. 29, 2013

(65) Prior Publication Data

US 2014/0086330 A1 Mar. 27, 2014

Related U.S. Application Data

(60) Provisional application No. 61/704,653, filed on Sep. 24, 2012.

(51) Int. Cl.
*H04N 19/119* (2014.01)
*H04N 19/157* (2014.01)
*H04N 19/172* (2014.01)

(52) U.S. Cl.
CPC ......... *H04N 19/119* (2014.11); *H04N 19/157* (2014.11); *H04N 19/172* (2014.11)

(58) Field of Classification Search
USPC .................................................. 375/240.24
See application file for complete search history.

(56) References Cited

U.S. PATENT DOCUMENTS

2012/0314026 A1* 12/2012 Chen ...................... H04N 19/98
348/43

OTHER PUBLICATIONS

Bross et al., "High Efficiency Video Coding (HEVC) Text Specification Draft 8," JCTVC-J1003_d7, Joint Collaborative Team on Video Coding (JCT-VC) of ITU-T SG16 WP3 and ISO/IEC JTC1/SC29/WG11, Jul. 11-20, 2012, Stockholm, Sweden (Year: 2012).*
Thomas Wiegand et al, "WD3: Working Draft 3 of High-Efficiency Video Coding", JCTVC-E603, Joint Collaborative Team on Video Coding (JCT-VC) of ITU-T SG16 WP3 and ISO/IEC JTC1/SC29/WG11, pp. 1-215, Mar. 16-23, 2011, Geneva, Switzerland.
Benjamin Bross et al, "WD4: Working Draft 4 of High-Efficiency Video Coding", JCTVC-F803_d6, Joint Collaborative Team on Video Coding (JCT-VC) of ITU-T SG16 WP3 and ISO/IEC JTC1/SC29/WG11, pp. 1-217, Jul. 14-22, 2011, Torino, Italy.
Benjamin Bross et al, "WD5: Working Draft 5 of High-Efficiency Video Coding", JCTVC-G1103_d9, Joint Collaborative Team on Video Coding (JCT-VC) of ITU-T SG16 WP3 and ISO/IEC JTC1/SC29/WG11, pp. 1-223, Nov. 21-30, 2011, Geneva, Switzerland.

(Continued)

*Primary Examiner* — Stuart D Bennett
(74) *Attorney, Agent, or Firm* — Gregory J. Albin; Charles A. Brill; Frank D. Cimino

(57) ABSTRACT

A method for encoding a picture of a video sequence in a bit stream that constrains tile processing overhead is provided. The method includes computing a maximum tile rate for the video sequence, computing a maximum number of tiles for the picture based on the maximum tile rate, and encoding the picture wherein a number of tiles used to encode the picture is enforced to be no more than the maximum number of tiles.

25 Claims, 6 Drawing Sheets

(56) References Cited

OTHER PUBLICATIONS

Benjamin Bross et al, "High Efficiency Video Coding (HEVC) Text Specification Draft 6", JCTVC-H1003, Joint Collaborative Team on Video Coding (JCT-VC) of ITU-T SG16 WP3 and ISO/IEC JTC1/SC29/WG11, pp. 1-249, Nov. 21-30, 2011, Geneva, Switzerland.

Benjamin Bross et al, "High Efficiency Video Coding (HEVC) Text Specification Draft 7", JCTVC-I1003_d9, Joint Collaborative Team on Video Coding (JCT-VC) of ITU-T SG16 WP3 and ISO/IEC JTC1/SC29/WG11, pp. 1-260, Apr. 27-May 7, 2012, Geneva, Switzerland.

Benjamin Bross et al, "High Efficiency Video Coding (HEVC) Text Specification Draft 8", JCTVC-J1003_d7, Joint Collaborative Team on Video Coding (JCT-VC) of ITU-T SG16 WP3 and ISO/IEC JTC1/SC29/WG11, pp. 1-250, Jul. 11, 20, 2012, Stockholm, Sweden.

Minhua Zhou, "AHG9: On Number of Tiles Constraint", JCTVC-K0202, Joint Collaborative Team on Video Coding (JCT-VC) of ITU-T SG16 WP3 and ISO/IEC JTC1/SC29/WG11, pp. 1-2, Oct. 10-19, 2012, Shanghai, China.

Minhua Zhou, "AHG9: On Number of Tiles Constraint", JCTVC-K0202 presentation, Joint Collaborative Team on Video Coding (JCT-VC) of ITU-T SG16 WP3 and ISO/IEC JTC1/SC29/WG11, pp. 1-4, Oct. 10-19, 2012, Shanghai, China.

Benjamin Bross et al, "High Efficiency Video Coding (HEVC) Text Specification Draft 9", JCTVC-K1003_v13, Joint Collaborative Team on Video Coding (JCT-VC) of ITU-T SG16 WP3 and ISO/IEC JTC1/SC29/WG11, pp. 1-293, Oct. 10-19, 2012, Shanghai, China.

Benjamin Bross et al, High Efficiency Video Coding (HEVC) Text Specification Draft 10 (for FDIS & Last Call), JCTVC-L1003_v34, Joint Collaborative Team on Video Coding (JCT-VC) of ITU-T SG16 WP3 and ISO/IEC JTC1/SC29/WG11, pp. 1-298, Jan. 14-23, 2013, Geneva, Switzerland.

"TMS320DM6467 Digital Media System-on-Chip", SPRS403G, Texas Instruments Incorporated, Dec. 2007, revised Oct. 2010, pp. 1-355.

* cited by examiner

FIG. 2
(PRIOR ART)

| | | | | | | | | | | | | | |
|---|---|---|---|---|---|---|---|---|---|---|---|---|---|
| MAX NUMBER OF TILE COLUMNS MaxTileCols | | 1 | 1 | 1 | 2 | 3 | 5 | 5 | 10 | 10 | 10 | 20 | 20 | 20 |
| MAX NUMBER OF TILE ROWS MaxTileRows | | 1 | 1 | 1 | 2 | 3 | 5 | 5 | 11 | 11 | 11 | 22 | 22 | 22 |
| MAX SLICES PER PICTURE MaxSlicesPerPicture | | 16 | 16 | 20 | 30 | 40 | 75 | 75 | 200 | 200 | 200 | 600 | 600 | 600 |
| MIN COMPRESSION RATIO MinCR | | 2 | 2 | 2 | 2 | 2 | 4 | 4 | 6 | 8 | 8 | 8 | 8 | 6 |
| MAX CPB SIZE MaxCPB (1000 BITS) | HIGH TIER | - | - | - | - | - | 30 000 | 50 000 | 100 000 | 160 000 | 240 000 | 240 000 | 480 000 | 800 000 |
| | MAIN TIER | 350 | 1 500 | 3 000 | 6 000 | 10 000 | 12 000 | 20 000 | 25 000 | 40 000 | 60 000 | 60 000 | 120 000 | 240 000 |
| MAX BIT RATE MaxBR (1000 BITS/S) | HIGH TIER | - | - | - | - | - | 30 000 | 50 000 | 100 000 | 160 000 | 240 000 | 240 000 | 480 000 | 800 000 |
| | MAIN TIER | 128 | 1 500 | 3 000 | 6 000 | 10 000 | 12 000 | 20 000 | 25 000 | 40 000 | 60 000 | 60 000 | 120 000 | 240 000 |
| MAX LUMA PICTURE SIZE MaxLumaPS (SAMPLES) | | 36 864 | 122 880 | 245 760 | 552 960 | 983 040 | 2 228 224 | 2 228 224 | 8 912 896 | 8 912 896 | 8 912 896 | 33 423 360 | 33 423 360 | 33 423 360 |
| MAX LUMA SAMPLE RATE MaxLumaSR (SAMPLES/SEC) | | 552 960 | 3 686 400 | 7 372 800 | 16 588 800 | 33 177 600 | 66 846 720 | 133 693 440 | 267 386 880 | 534 773 760 | 1 069 547 520 | 1 069 547 520 | 2 005 401 600 | 4 010 803 200 |
| LEVEL | | 1 | 2 | 2.1 | 3 | 3.1 | 4 | 4.1 | 5 | 5.1 | 5.2 | 6 | 6.1 | 6.2 |

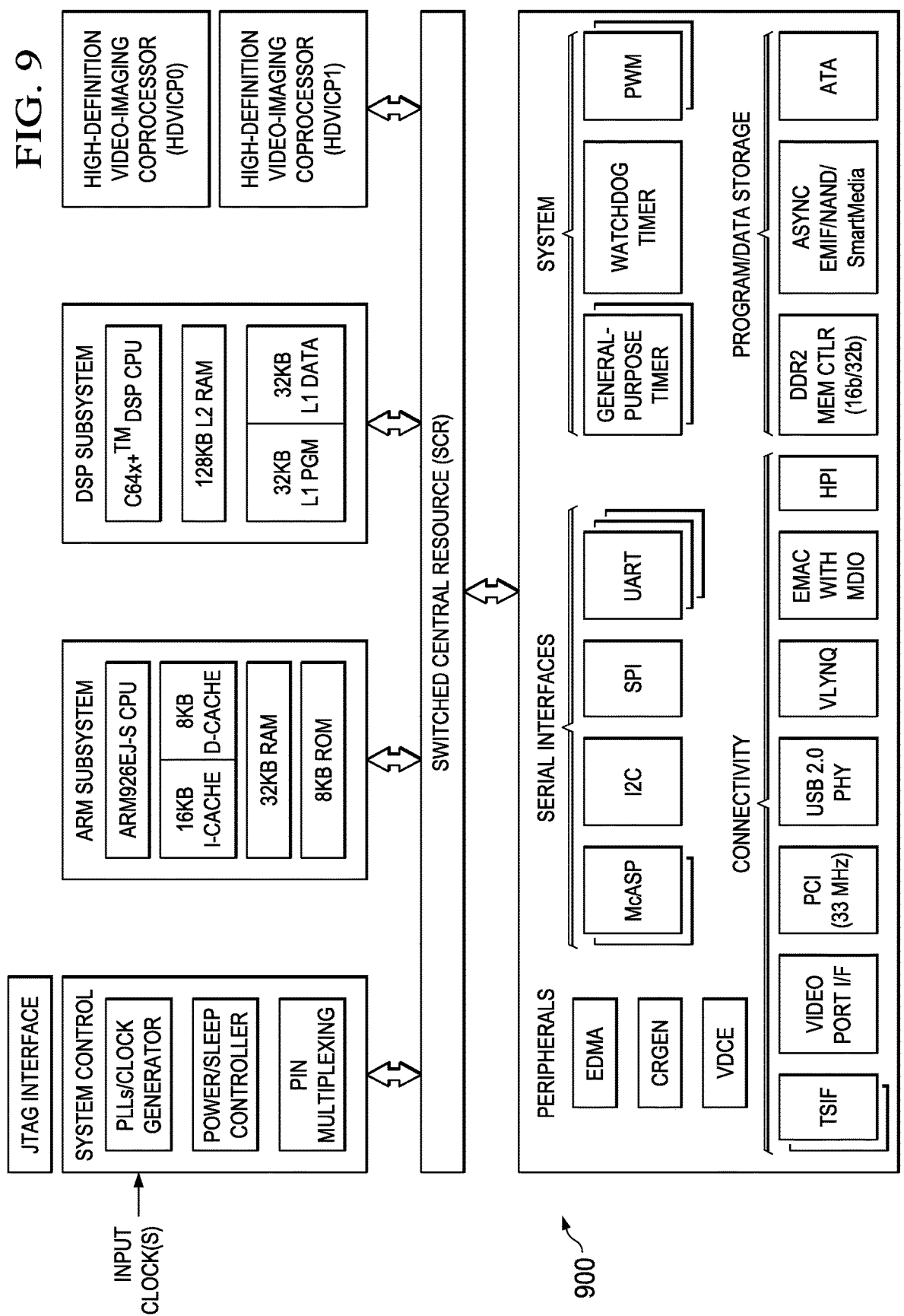

METHOD AND SYSTEM FOR CONSTRAINING TILE PROCESSING OVERHEAD IN VIDEO CODING

CROSS-REFERENCE TO RELATED APPLICATIONS

This application claims benefit of U.S. Provisional Patent Application Ser. No. 61/704,653, filed Sep. 24, 2012, which is incorporated herein by reference in its entirety.

BACKGROUND OF THE INVENTION

1. Field of the Invention

Embodiments of the present invention generally relate to constraining tile processing overhead in video coding.

2. Description of the Related Art

The Joint Collaborative Team on Video Coding (JCT-VC) of ITU-T WP3/16 and ISO/IEC JTC 1/SC 29/WG 11 is currently developing the next-generation video coding standard referred to as High Efficiency Video Coding (HEVC). Similar to previous video coding standards such as H.264/AVC, HEVC is based on a hybrid coding scheme using block-based prediction and transform coding. First, the input signal is split into rectangular blocks that are predicted from the previously decoded data by either motion compensated (inter) prediction or intra prediction. The resulting prediction error is coded by applying block transforms based on an integer approximation of the discrete cosine transform, which is followed by quantization and coding of the transform coefficients.

In HEVC, a largest coding unit (LCU) is the base unit used for block-based coding. A picture is divided into non-overlapping LCUs. That is, an LCU plays a similar role in coding as the macroblock of H.264/AVC, but it may be larger, e.g., 32×32, 64×64, etc. An LCU may be partitioned into coding units (CU). A CU is a block of pixels within an LCU and the CUs within an LCU may be of different sizes. The partitioning is a recursive quadtree partitioning. The quadtree is split according to various criteria until a leaf is reached, which is referred to as the coding node or coding unit. The maximum hierarchical depth of the quadtree is determined by the size of the smallest CU (SCU) permitted. The coding node is the root node of two trees, a prediction tree and a transform tree. A prediction tree specifies the position and size of prediction units (PU) for a coding unit. A transform tree specifies the position and size of transform units (TU) for a coding unit. A transform unit may not be larger than a coding unit and the size of a transform unit may be, for example, 4×4, 8×8, 16×16, and 32×32. The sizes of the transforms units and prediction units for a CU are determined by the video encoder during prediction based on minimization of rate/distortion costs.

To support efficient implementation on multi-code platforms, several parallel processing tools have been adopted into HEVC. One of these tools is tiling. Tiling enables a picture to be partitioned into groups of LCUs referred to as tiles that may independently processed. The processing overhead in a decoder associated with tiles includes the processing for transitioning from one tile to the next. During the transition, a decoder needs to perform processing to, for example, reset CABAC and store the samples, motion data and inter-prediction and/or intra-prediction flags from neighboring tiles for loop filtering along tile boundaries. Such processing for a large number of tiles may make it difficult to perform real-time decoding. Accordingly, constraining the tile processing overhead is desirable.

SUMMARY

Embodiments of the present invention relate to methods, apparatus, and computer readable media that constrain tile processing overhead as compared to the prior art. In one aspect, a method for encoding a picture of a video sequence in a bit stream is provided that includes computing a maximum tile rate for the video sequence, computing a maximum number of tiles for the picture based on the maximum tile rate, and encoding the picture wherein a number of tiles used to encode the picture is enforced to be no more than the maximum number of tiles.

In one aspect, a method for encoding a picture of a video sequence in a bit stream is provided that includes determining a level for the video sequence, computing a maximum tile rate for the video sequence as MaxLumaSR/MaxLumaPS*MaxTileCols*MaxTileRows, wherein MaxLumaSR is a maximum luma sample rate specified for the level, MaxLumaPS is a maximum luma picture size in samples specified for the level, MaxTileCols is a maximum number of tile columns per picture specified for the level, and MaxTileRows is a maximum number of tile rows per picture specified for the level, computing a maximum number of tiles for the picture as a minimum of MaxTileCols*MaxTileRows and the maximum tile rate divided by a frame rate of the video sequence when the frame rate is fixed, computing a maximum number of tiles for the picture as a minimum of MaxTileCols*MaxTileRows and the maximum tile rate multiplied by a difference in display time between the picture and a picture immediately preceding the picture in display order when the frame rate is variable, and encoding the picture wherein a number of tiles used to encode the picture is constrained to be no more than the maximum number of tiles.

In one aspect, an apparatus configured to encode a picture of a video sequence in a bit stream is provided that includes means for computing a maximum tile rate for the video sequence, means for computing a maximum number of tiles for the picture based on the maximum tile rate, and means for encoding the picture wherein a number of tiles used to encode the picture is enforced to be no more than the maximum number of tiles.

BRIEF DESCRIPTION OF THE DRAWINGS

Particular embodiments will now be described, by way of example only, and with reference to the accompanying drawings:

FIG. 2 is an example level table for a profile;
FIG. 9 is a block diagram of an illustrative digital system.

DETAILED DESCRIPTION OF EMBODIMENTS OF THE INVENTION

Figure 1:
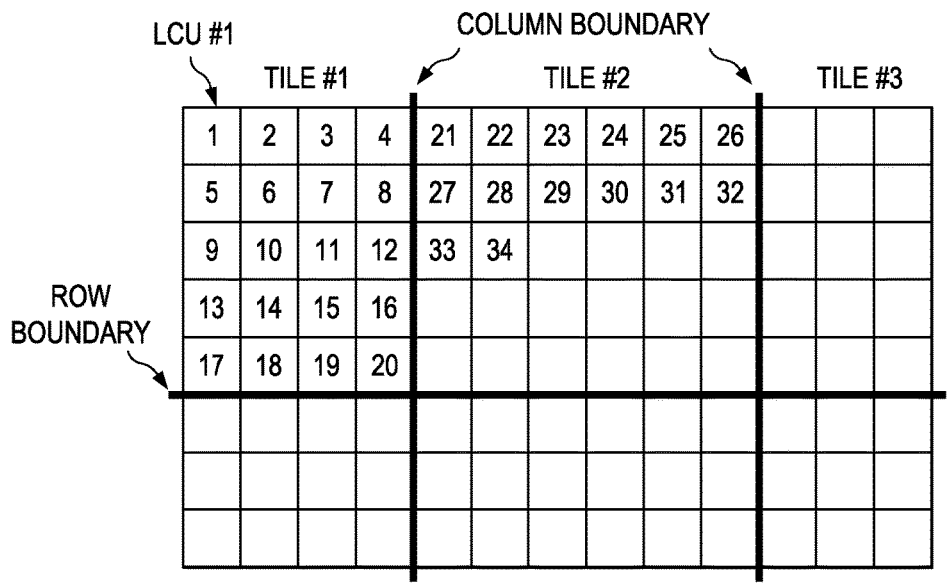
FIG. 1 is an example illustrating partitioning of a picture into tiles.

Specific embodiments of the invention will now be described in detail with reference to the accompanying figures. Like elements in the various figures are denoted by like reference numerals for consistency.

As used herein, the term "picture" may refer to a frame or a field of a frame. A frame is a complete image captured during a known time interval. For convenience of description, embodiments are described herein in reference to HEVC. One of ordinary skill in the art will understand that embodiments of the invention are not limited to HEVC.

Various versions of HEVC are described in the following documents, which are incorporated by reference herein: T. Wiegand, et al., "WD3: Working Draft 3 of High-Efficiency Video Coding," JCTVC-E603, Joint Collaborative Team on Video Coding (JCT-VC) of ITU-T SG16 WP3 and ISO/IEC JTC1/SC29/VVG11, Geneva, CH, Mar. 16-23, 2011 ("WD3"), B. Bross, et al., "WD4: Working Draft 4 of High-Efficiency Video Coding," JCTVC-F803_d6, Joint Collaborative Team on Video Coding (JCT-VC) of ITU-T SG16 WP3 and ISO/IEC JTC1/SC29/WG11, Torino, IT, Jul. 14-22, 2011 ("WD4"), B. Bross. et al., "WD5: Working Draft 5 of High-Efficiency Video Coding," JCTVC-G1103_d9, Joint Collaborative Team on Video Coding (JCT-VC) of ITU-T SG16 WP3 and ISO/IEC JTC1/SC29/WG11, Geneva, C H, Nov. 21-30, 2011 ("WD5"), B. Bross, et al., "High Efficiency Video Coding (HEVC) Text Specification Draft 6," JCTVC-H1003_dK, Joint Collaborative Team on Video Coding (JCT-VC) of ITU-T SG16 WP3 and ISO/IEC JTC1/SC29/WG1, San Jose, Calif., Feb. 1-10, 2012, ("HEVC Draft 6"), B. Bross, et al., "High Efficiency Video Coding (HEVC) Text Specification Draft 7," JCTVC-11003_d9, Joint Collaborative Team on Video Coding (JCT-VC) of ITU-T SG16 WP3 and ISO/IEC JTC1/SC29/WG1, Geneva, C H, Apr. 17-May 7, 2012 ("HEVC Draft 7"), B. Bross, et al., "High Efficiency Video Coding (HEVC) Text Specification Draft 8," JCTVC-J1003_d7, Joint Collaborative Team on Video Coding (JCT-VC) of ITU-T SG16 WP3 and ISO/IEC JTC1/SC29/WG1, Stockholm, S E, Jul. 11-20, 2012 ("HEVC Draft 8"), B. Bross, et al., "High Efficiency Video Coding (HEVC) Text Specification Draft 9," JCTVC-K1003_v13, Joint Collaborative Team on Video Coding (JCT-VC) of ITU-T SG16 WP3 and ISO/IEC JTC1/SC29/WG1, Shanghai, CN, Oct. 10-19, 2012 ("HEVC Draft 9"), and B. Bross, et al., "High Efficiency Video Coding (HEVC) Text Specification Draft 10 (for FDIS & Last Call)," JCTVC-L1003_v34, Joint Collaborative Team on Video Coding (JCT-VC) of ITU-T SG16 WP3 and ISO/IEC JTC1/SC29/WG1, Geneva, C H, Jan. 14-23, 2013 ("HEVC Draft 10").

Some aspects of this disclosure have been presented to the JCT-VC in M. Zhou, "AHG9: On Number of Tiles Constraint," JCTVC-K0202, Joint Collaborative Team on Video Coding (JCT-VC) of ITU-T SG16 WP3 and ISO/IEC JTC1/SC29/WG1, Shanghai, China, Oct. 10-19, 2012, which is incorporated by reference herein in its entirety.

As previously mentioned, constraining the overhead of processing tiles is desirable. FIG. 1 shows an example of a picture partitioned into six tiles. A tile includes an integer number of LCUs and each tile is required to be independently decodable, i.e., all parts of the decoding process are independent from tile to tile except for in-loop filters (e.g., deblocking and sample adaptive offset filtering). The LCUs of a tile are coded in raster scanning order, and the tiles of a picture are coded in raster scan order. Within a picture, tiles of the picture are coded in raster scanning order.

As previously mentioned, there is processing overhead associated with a tile. During the tile transitions, a decoder needs to, for example, reset CABAC, and store the samples and prediction data from neighboring tiles for loop-filtering along tile boundaries. To enable real-time decoding, it is important to constrain the worst case number of tiles allowed for pictures.

In the prior art HEVC specification, HEVC Draft 8, the tile processing overhead issue is addressed by restricting the maximum number of tiles in pictures in bit streams in levels of profiles. In HEVC (and other video coding standards), a profile specifies a set of coding tools that are supported by the profile, and a level specfies parameter constraints such as maxiumum sample rate, maxiumum bit-rate, maxiumum picture size, etc. To conform to a particular profile and level, the pictures in a bit stream must have no more tiles than a maximum number derived from the level parameters. More specifically, the number of tile columns minus 1 (num_tile_columns_minus1) in each picture is required to be less than a maximum number of tile columns referred to as MaxTileCols and the number of tile rows minus 1 (num_tile_rows_minus1) is required to be less than a maximum number of tile rows refererred to as MaxTileRows. Thus, the total number of tiles of a picture, which can be expressed as (num_tile_columns_minus1+1) multiplied by (num_tile_rows_minus1+1) is required to be less than or equal to MaxTileCols multiplied by MaxTileRows. The values of MaxTileCols and MaxTileRows are level dependent and are specified in Table A-1 of HEVC Draft 8. This table is replicated in FIG. 2. In addition, HEVC also requires that the mimimum tile size must be greater than or equal to 256×64 luma samples.

For any given level, a complaint decoder may need to support real-time decoding of video bit streams with different frame-rates and/or picture sizes. For example, level 5 in the table of FIG. 2 supports 4K×2K@30 (4K×2K pictures at 30 frames per second) and the maximum number of tiles per second is 3300 tiles/sec, i.e., 30 frames/sec multiplied by 11*10 tiles/frame). For the same maximum sample rate constraint of level 5, a level 5 compliant decoder also needs to be able to decode video bit streams at, for example, 1080p@120 and 720p@240, in real-time. Because only the maximum number of tiles per picture is fixed (11*10 per picture in this case), the worst case number of tiles per second increases to 13200 tiles/sec, i.e., 120 frames/sec multiplied by 110 tiles/frame and 13500 tiles/sec, i.e., 240 frames/sec multiplied by (1280*720)/(256*64), as it is limited by the minimum tile size of 256×64 for 1080p@120 and 720p@240, respectively. Thus, the worst case tile processing overhead can vary for a level based on the frame rate of the incoming compressed video bit stream, which imposes an unacceptable burden in the design of a real-time decoder which is required to deal with worst cases. Therefore, merely limiting the maximum number of tiles per picture as in the prior art and specifying a minimum tile size of 256×64 is not sufficient for constraining tile processing overhead, because the overhead increases proportionally to the frame-rate of a coded video sequence.

Embodiments of the invention provide for constraining the worst case number of tiles per second rate to be constant for a level. The worst case number of tiles per second rate, i.e., the maximum tile rate (MaxTileRate), for a level may be defined as $$MaxTileRate = MaxLumaSR / MaxLumaPS * MaxTileCols * MaxTileRows$$

where MaxLumaSR is the maximum luma sample rate, MaxLumaPS is the maximum luma picture size in samples, MaxTileCols is the maximum number of tile columns, and MaxTileRows is the maximum number of tile rows. Example values of MaxLumaSR, MaxLumaPS, MaxTile- Cols, and MaxTileRows for each level are shown in the example level table of FIG. 2. One of ordinary skill in the art will understand embodiments in which other suitable values are used and/or in which more or fewer levels are specified for a profile. One of ordinary skill in the art will also understand that the parameters used to compute the maximum tile rate may differ depending upon the particular parameters defined for levels.

Figure 3:
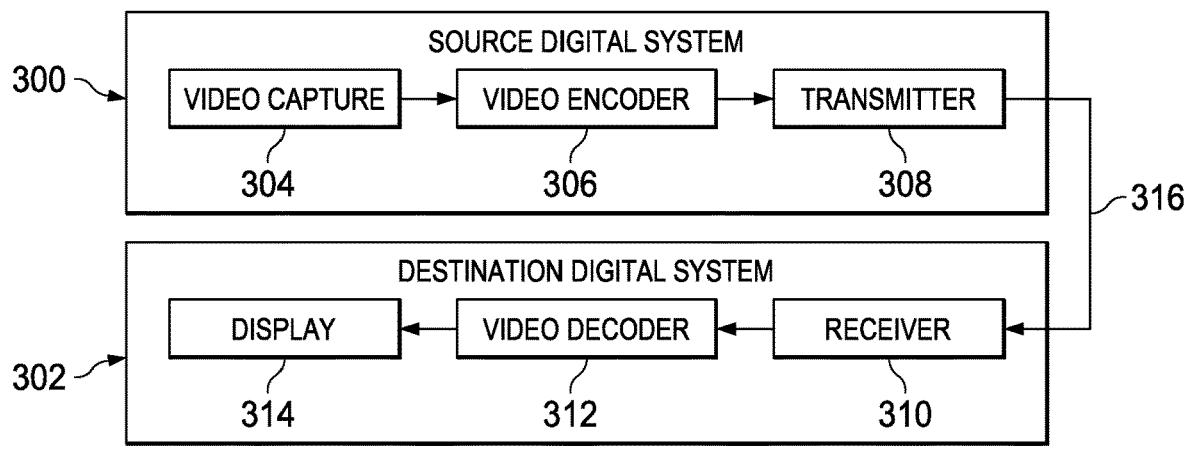
FIG. 3 is a block diagram of a digital system.

FIG. 3 shows a block diagram of a digital system that includes a source digital system 300 that transmits encoded video sequences to a destination digital system 302 via a communication channel 316. The source digital system 300 includes a video capture component 304, a video encoder component 306, and a transmitter component 308. The video capture component 304 is configured to provide a video sequence to be encoded by the video encoder component 306. The video capture component 304 may be, for example, a video camera, a video archive, or a video feed from a video content provider. In some embodiments, the video capture component 304 may generate computer graphics as the video sequence, or a combination of live video, archived video, and/or computer-generated video.

The video encoder component 306 receives a video sequence from the video capture component 304 and encodes it for transmission by the transmitter component 308. The video encoder component 306 receives the video sequence from the video capture component 304 as a sequence of pictures, divides the pictures into largest coding units (LCUs), and encodes the video data in the LCUs. The video encoder component 306 may be configured to comply with a worst case number of tiles per second rate during the encoding process as described herein. An embodiment of the video encoder component 306 is described in more detail herein in reference to FIGS. 4A and 4B.

The transmitter component 308 transmits the encoded video data to the destination digital system 302 via the communication channel 316. The communication channel 316 may be any communication medium, or combination of communication media suitable for transmission of the encoded video sequence, such as, for example, wired or wireless communication media, a local area network, or a wide area network.

The destination digital system 302 includes a receiver component 310, a video decoder component 312 and a display component 314. The receiver component 310 receives the encoded video data from the source digital system 300 via the communication channel 316 and provides the encoded video data to the video decoder component 312 for decoding. The video decoder component 312 reverses the encoding process performed by the video encoder component 306 to reconstruct the LCUs of the video sequence. The video decoder component 312 may be configured to confirm compliance with a worst case number of tiles per second rate during the decoding process as described herein. An embodiment of the video decoder component 312 is described in more detail below in reference to FIG. 5.

The reconstructed video sequence is displayed on the display component 314. The display component 314 may be any suitable display device such as, for example, a plasma display, a liquid crystal display (LCD), a light emitting diode (LED) display, etc.

In some embodiments, the source digital system 300 may also include a receiver component and a video decoder component and/or the destination digital system 302 may include a transmitter component and a video encoder component for transmission of video sequences both directions for video streaming, video broadcasting, and video telephony. Further, the video encoder component 306 and the video decoder component 312 may perform encoding and decoding in accordance with one or more video compression standards. The video encoder component 306 and the video decoder component 312 may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc.

Figure 4A:
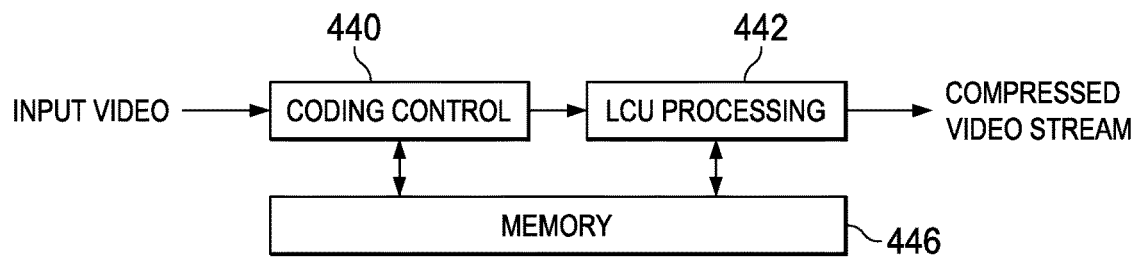
FIGS. 4A and 4B are a block diagram of an example video encoder.
Figure 4B:
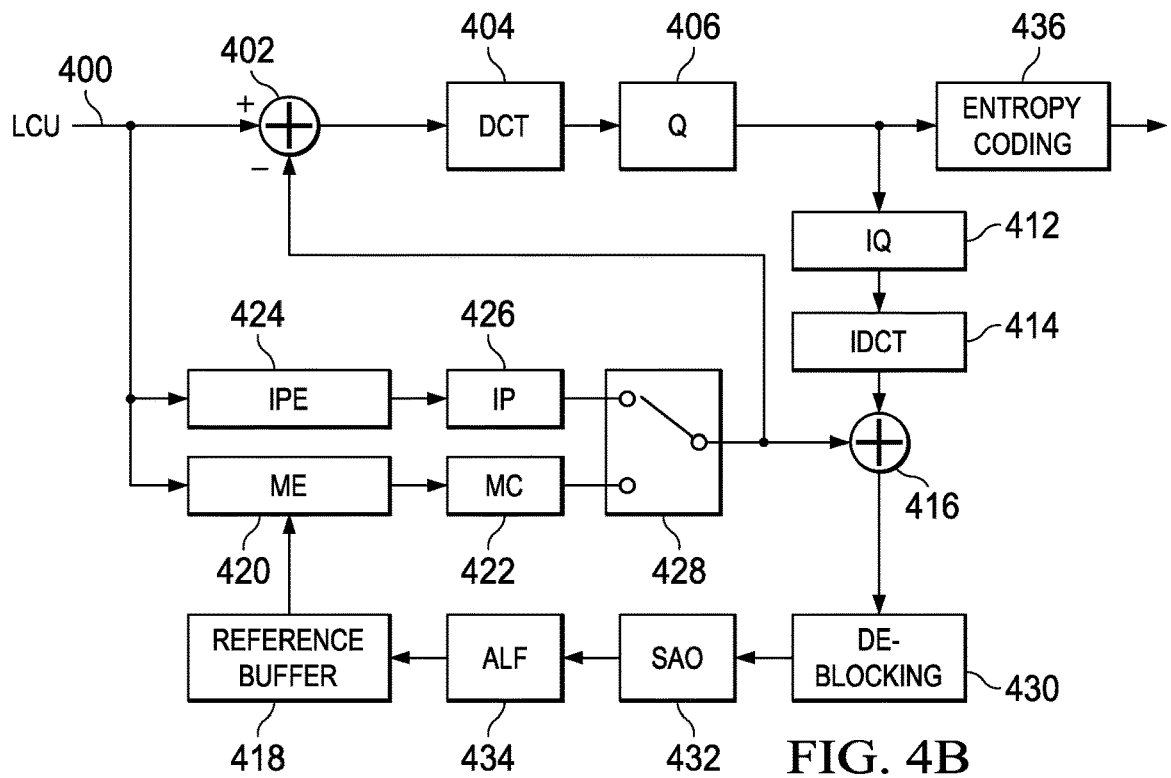

FIGS. 4A and 4B show block diagrams of an example video encoder configured to constrain the tile rate per picture during the encoding process to be less than or equal to a worst case number of tiles per second rate. FIG. 4A shows a high level block diagram of the video encoder and FIG. 4B shows a block diagram of the LCU processing component 642 of the video encoder. As shown in FIG. 4A, the video encoder includes a coding control component 440, an LCU processing component 442, and a memory 446. The memory 446 may be internal (on-chip) memory, external (off-chip) memory, or a combination thereof. The memory 446 may be used to communicate information between the various components of the video encoder.

An input digital video sequence is provided to the coding control component 440. The coding control component 440 sequences the various operations of the video encoder, i.e., the coding control component 440 runs the main control loop for video encoding. For example, the coding control component 440 performs processing on the input video sequence that is to be done at the picture level, such as determining the coding type (I, P, or B) of a picture based on a high level coding structure, e.g., IPPP, IBBP, hierarchical-B, and dividing a picture into LCUs for further processing.

In addition, for pipelined architectures in which multiple LCUs may be processed concurrently in different components of the LCU processing, the coding control component 440 controls the processing of the LCUs by various components of the LCU processing in a pipeline fashion. For example, in many embedded systems supporting video processing, there may be one master processor and one or more slave processing modules, e.g., hardware accelerators. The master processor operates as the coding control component and runs the main control loop for video encoding, and the slave processing modules are employed to off load certain compute-intensive tasks of video encoding such as motion estimation, motion compensation, intra prediction mode estimation, transformation and quantization, entropy coding, and loop filtering. The slave processing modules are controlled in a pipeline fashion by the master processor such that the slave processing modules operate on different LCUs of a picture at any given time. That is, the slave processing modules are executed in parallel, each processing its respective LCU while data movement from one processor to another is serial.

The coding control component 440 also determines the profile and level within the profile for the video sequence to be encoded. Typically, an encoder is designed for a particular profile. For example, HEVC currently defines two profiles: the Main profile for 8-bit video and the Main-10 profile for 8-bit and 10-bit video. If the encoder is designed for only the Main profile, then the profile of any incoming 8-bit video will be the Main profile. If the encoder is designed for the Main-10 profile, then the profile of an incoming video sequence is set based on the bit-depth of the video. That is, if the video is 8-bit video, then the profile will be the Main profile, and if the video is 10-bit video, then the profile will be the Main-10 profile. Typically, the encoder selects a level from the profile that is the minimum level satisfying the picture size, frame rate, bit-rate, etc. of the incoming video sequence as the desired result is to select a level that communicates to a decoder the minimum capability needed to decode the resulting compressed bit stream.

Once the profile and level are determined, the coding control component 440 computes a maximum tile rate (worst case number of tiles per second) for pictures in the video sequence based on parameter values defined for the level. Computation of the maximum tile rate is previously discussed herein.

The coding control component 440 then constrains the tile rate for each picture to be less than or equal to the maximum tile rate. In some embodiments, the coding control component 440 constrains the tile rate by computing a maximum number of tiles for each picture based on the maximum tile rate constraint and then restricting the number of tiles used in encoding of the picture to be less than or equal to the computed maximum tile number. More specifically, for each fixed frame rate picture, the coding control component 440 computes the maximum number of tiles for the picture as $$\min(MaxTileCols*MaxTileRows, MaxTileRate/FrameRate)$$

where the value of MaxTileRate is the maximum tile rate computed as previously described, and min(a, b) returns the minimum value of a and b. As previously mentioned, MaxTileCols and MaxTileRows are, respectively, the maximum number of tile columns and the maximum number of tile rows in a picture. Note that a picture should contain at least one tile; thus, the minimum value of the maximum number of tiles in a picture is one.

Figure 8:
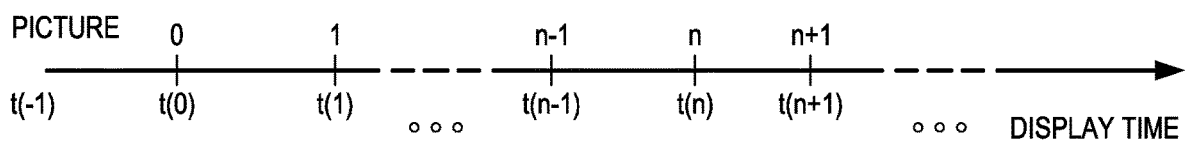
FIG. 8 is an example variable frame rate sequence.

For each variable frame rate picture, the coding control component 440 computes the maximum number of tiles for the picture as $$\min(MaxTileCols*MaxTileRows, MaxTileRate*(t(n)-t(n-1)))$$

where $t(n)$ is the display time of picture n in display order. For the first picture in the sequence (i.e., n=0), the intitial display time, i.e., $t(-1)$, can be determined by the initial specified delays. FIG. 8 shows an example variable frame rate sequence.

The operation of the coding control component 440 to constrain the number of tiles in a picture to be less than or equal to the computed maximum number of tiles for the picture may be performed in any suitable way and may depend on the application using the video encoder. For example, the coding control component 440 may select the number of tiles (where the tiles are approximately equal in size) for a picture to be less than or equal to the computed maximum number of tiles for the picture and then encode the picture tile by tile in raster scan order. Note that a tile contains an integer number of LCUs. The coding control component 440 also causes tile-related information indicating the number of tiles, the tiles sizes, and the tile locations to be encoded in the picture parameter set for a picture.

FIG. 4B is a block diagram of the LCU processing component 442. The LCU processing component 442 receives LCUs 400 of the input video sequence from the coding control component and encodes the LCUs 400 under the control of the coding control component 440 to generate the compressed video stream. The LCUs 400 in each picture are processed in row order. The LCUs 400 from the coding control component are provided as one input of a motion estimation component (ME) 420, as one input of an intra-prediction estimation component (IPE) 424, and to a positive input of a combiner 402 (e.g., adder or subtractor or the like). Further, although not specifically shown, the prediction mode of each picture as selected by the coding control component 440 is provided to a mode decision component 428 and the entropy coding component 436.

The storage component 418 provides reference data to the motion estimation component 420 and to the motion compensation component 422. The reference data may include one or more previously encoded and decoded pictures, i.e., reference pictures. Both list 0 and list 1 reference pictures may be stored by the storage component 418.

The motion estimation component 420 provides motion data information to the motion compensation component 422 and the entropy coding component 436. More specifically, the motion estimation component 420 performs tests on CUs in an LCU based on multiple inter-prediction modes (e.g., skip mode, merge mode, and normal or direct inter-prediction), PU sizes, and TU sizes using reference picture data from storage 418 to choose the best CU partitioning, PU/TU partitioning, inter-prediction modes, motion vectors, etc. based on coding cost, e.g., a rate distortion coding cost. To perform the tests, the motion estimation component 420 may divide an LCU into CUs according to the maximum hierarchical depth of the quadtree, and divide each CU into PUs according to the unit sizes of the inter-prediction modes and into TUs according to the transform unit sizes, and calculate the coding costs for each PU size, prediction mode, and transform unit size for each CU. The motion estimation component 420 provides the motion vector (MV) or vectors and the prediction mode for each PU in the selected CU partitioning to the motion compensation component (MC) 422.

The motion compensation component 422 receives the selected inter-prediction mode and mode-related information from the motion estimation component 420 and generates the inter-predicted CUs. The inter-predicted CUs are provided to the mode decision component 428 along with the selected inter-prediction modes for the inter-predicted PUs and corresponding TU sizes for the selected CU/PU/TU partitioning. The coding costs of the inter-predicted CUs are also provided to the mode decision component 428.

The intra-prediction estimation component 424 (IPE) performs intra-prediction estimation in which tests on CUs in an LCU based on multiple intra-prediction modes, PU sizes, and TU sizes are performed using reconstructed data from previously encoded neighboring CUs stored in a buffer (not shown) to choose the best CU partitioning, PU/TU partitioning, and intra-prediction modes based on coding cost, e.g., a rate distortion coding cost. To perform the tests, the intra-prediction estimation component 424 may divide an LCU into CUs according to the maximum hierarchical depth of the quadtree, and divide each CU into PUs according to the unit sizes of the intra-prediction modes and into TUs according to the transform unit sizes, and calculate the coding costs for each PU size, prediction mode, and transform unit size for each PU. The intra-prediction estimation component 424 provides the selected intra-prediction modes for the PUs and the corresponding TU sizes for the selected CU partitioning to the intra-prediction component (IP) 426. The coding costs of the intra-predicted CUs are also provided to the intra-prediction component 426.

The intra-prediction component 426 (IP) receives intra-prediction information, e.g., the selected mode or modes for the PU(s), the PU size, etc., from the intra-prediction estimation component 424 and generates the intra-predicted CUs. The intra-predicted CUs are provided to the mode decision component 428 along with the selected intra-prediction modes for the intra-predicted PUs and corresponding TU sizes for the selected CU/PU/TU partitioning. The coding costs of the intra-predicted CUs are also provided to the mode decision component 428.

The mode decision component 428 selects between intra-prediction of a CU and inter-prediction of a CU based on the intra-prediction coding cost of the CU from the intra-prediction component 426, the inter-prediction coding cost of the CU from the motion compensation component 422, and the picture prediction mode provided by the coding control component. Based on the decision as to whether a CU is to be intra- or inter-coded, the intra-predicted PUs or inter-predicted PUs are selected. The selected CU/PU/TU partitioning with corresponding modes and other mode related prediction data (if any) such as motion vector(s) and reference picture index (indices), are provided to the entropy coding component 436.

The output of the mode decision component 428, i.e., the predicted PUs, is provided to a negative input of the combiner 402 and to the combiner 416. The associated transform unit size is also provided to the transform component 404. The combiner 402 subtracts a predicted PU from the original PU. Each resulting residual PU is a set of pixel difference values that quantify differences between pixel values of the original PU and the predicted PU. The residual blocks of all the PUs of a CU form a residual CU for further processing.

The transform component 404 performs block transforms on the residual CUs to convert the residual pixel values to transform coefficients and provides the transform coefficients to a quantize component 406. More specifically, the transform component 404 receives the transform unit sizes for the residual CU and applies transforms of the specified sizes to the CU to generate transform coefficients. Further, the quantize component 406 quantizes the transform coefficients based on quantization parameters (QPs) and quantization matrices provided by the coding control component and the transform sizes and provides the quantized transform coefficients to the entropy coding component 436 for coding in the bit stream.

The entropy coding component 436 entropy encodes the relevant data, i.e., syntax elements, output by the various encoding components and the coding control component using context-adaptive binary arithmetic coding (CABAC) to generate the compressed video bit stream. Among the syntax elements that are encoded are picture parameter sets, slice headers, flags indicating the CU/PU/TU partitioning of an LCU, the prediction modes for the CUs, and the quantized transform coefficients for the CUs. The entropy coding component 436 also entropy encodes relevant data from the in-loop filters such as the SAO parameters. As previously mentioned, a picture parameter set may include tile-related information indicating the number of tiles, the tiles sizes, and the tile locations for a picture.

The LCU processing includes an embedded decoder. As any compliant decoder is expected to reconstruct an image from a compressed bit stream, the embedded decoder provides the same utility to the video encoder. Knowledge of the reconstructed input allows the video encoder to transmit the appropriate residual energy to compose subsequent pictures.

The quantized transform coefficients for each CU are provided to an inverse quantize component (IQ) 412, which outputs a reconstructed version of the transform result from the transform component 404. The dequantized transform coefficients are provided to the inverse transform component (IDCT) 414, which outputs estimated residual information representing a reconstructed version of a residual CU. The inverse transform component 414 receives the transform unit size used to generate the transform coefficients and applies inverse transform(s) of the specified size to the transform coefficients to reconstruct the residual values. The reconstructed residual CU is provided to the combiner 416.

The combiner 416 adds the original predicted CU to the residual CU to generate a reconstructed CU, which becomes part of reconstructed picture data. The reconstructed picture data is stored in a buffer (not shown) for use by the intra-prediction estimation component 424.

Various in-loop filters may be applied to the reconstructed picture data to improve the quality of the reference picture data used for encoding/decoding of subsequent pictures. The in-loop filters may include a deblocking filter 430, a sample adaptive offset filter (SAO) 432, and an adaptive loop filter (ALF) 434. The in-loop filters 430, 432, 434 are applied to each reconstructed LCU in the picture and the final filtered reference picture data is provided to the storage component 418. In some embodiments, the ALF component 434 is not present.

Figure 5:
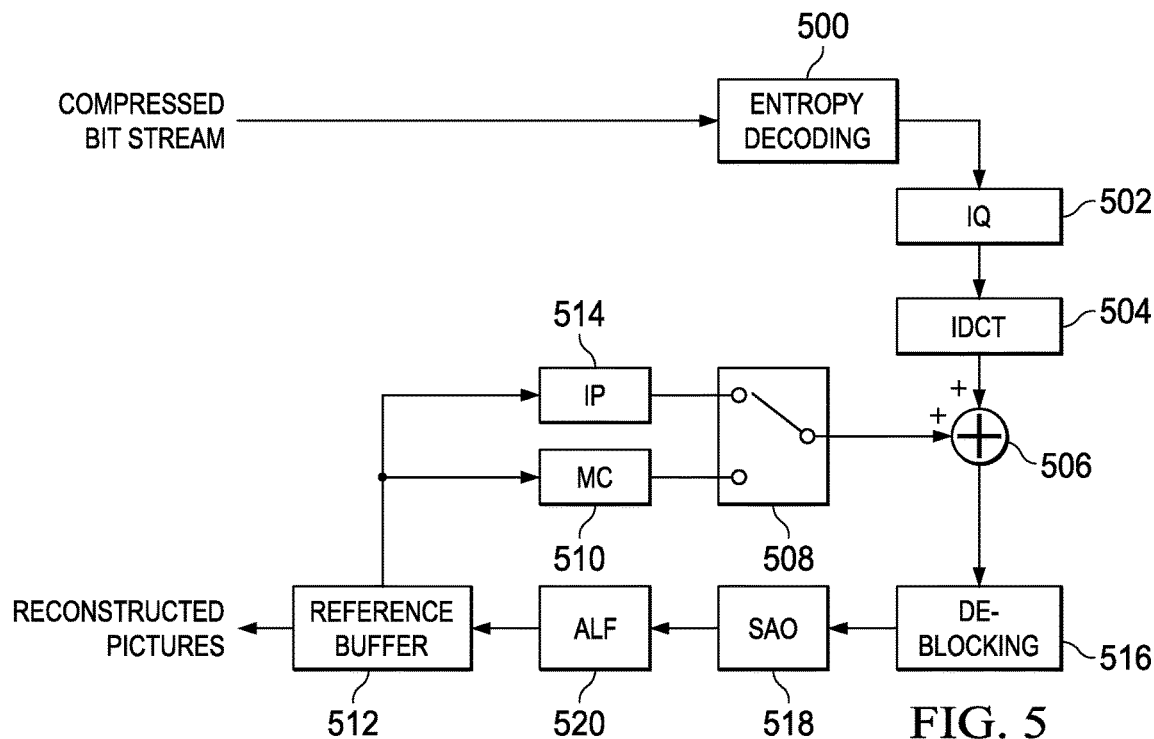
FIG. 5 is a block diagram of an example video decoder.

FIG. 5 is a block diagram of an example video decoder configured to verify during the decoding process that the tile rates of pictures are constrained to a maximum tile rate. The video decoder operates to reverse the encoding operations, i.e., entropy coding, quantization, transformation, and prediction, performed by the video encoder of FIGS. 4A and 4B to regenerate the pictures of the original video sequence. In view of the above description of a video encoder, one of ordinary skill in the art will understand the functionality of components of the video decoder without detailed explanation.

The entropy decoding component 500 receives an entropy encoded (compressed) video bit stream and reverses the entropy encoding using CABAC decoding to recover the encoded syntax elements, e.g., CU, PU, and TU structures of LCUs, quantized transform coefficients for CUs, motion vectors, prediction modes, weighted prediction parameters, SAO parameters, etc. The decoded syntax elements are passed to the various components of the decoder as needed. For example, decoded prediction modes are provided to the intra-prediction component (IP) 514 or motion compensation component (MC) 510. If the decoded prediction mode is an inter-prediction mode, the entropy decoder 500 reconstructs the motion vector(s) as needed and provides the motion vector(s) to the motion compensation component 510.

The entropy decoder 500 also recovers syntax elements indicating the profile and level used to encode the bit stream. The decoder may then compute an expected maximum tile rate (maximum number of tiles per second) for pictures in the bit stream based on parameter values defined for the level. Computation of the maximum tile rate is previously discussed herein. The decoder may then use this maximum tile rate to verify that the tile rate for each picture is less than or equal to the maximum tile rate. In some embodiments, the decoder computes a maximum number of tiles for each picture based on the maximum tile rate constraint and then compares the computed maximum number of tiles to the number of tiles indicated in a picture parameter set of a picture to verify that the number of tiles in the picture is than or equal to the computed maximum tile number. The decoder computes the maximum number of tiles for a picture (for a fixed frame rate or a variable frame rate) in the same manner as the encoder. The decoder may take any suitable action if the number of tiles indicated in a picture parameter set of a picture exceeds the computed maximum number of tiles for the picture. The particular action taken by the decoder may depend on the application using the decoder.

The inverse quantize component (IQ) 502 de-quantizes the quantized transform coefficients of the CUs. The inverse transform component 504 transforms the frequency domain data from the inverse quantize component 502 back to the residual CUs. That is, the inverse transform component 504 applies an inverse unit transform, i.e., the inverse of the unit transform used for encoding, to the de-quantized residual coefficients to produce reconstructed residual values of the CUs.

A residual CU supplies one input of the addition component 506. The other input of the addition component 506 comes from the mode switch 508. When an inter-prediction mode is signaled in the encoded video stream, the mode switch 508 selects predicted PUs from the motion compensation component 510 and when an intra-prediction mode is signaled, the mode switch selects predicted PUs from the intra-prediction component 514.

The motion compensation component 510 receives reference data from the storage component 512 and applies the motion compensation computed by the encoder and transmitted in the encoded video bit stream to the reference data to generate a predicted PU. That is, the motion compensation component 510 uses the motion vector(s) from the entropy decoder 500 and the reference data to generate a predicted PU.

The intra-prediction component 514 receives reconstructed samples from previously reconstructed PUs of a current picture from the storage component 512 and performs the intra-prediction computed by the encoder as signaled by an intra-prediction mode transmitted in the encoded video bit stream using the reconstructed samples as needed to generate a predicted PU.

The addition component 506 generates a reconstructed CU by adding the predicted PUs selected by the mode switch 508 and the residual CU. The output of the addition component 506, i.e., the reconstructed CUs, is stored in the storage component 512 for use by the intra-prediction component 514.

In-loop filters may be applied to reconstructed picture data to improve the quality of the decoded pictures and the quality of the reference picture data used for decoding of subsequent pictures. The applied in-loop filters are the same as those of the encoder, i.e., a deblocking filter 516, a sample adaptive offset filter (SAO) 518, and an adaptive loop filter (ALF) 520. The in-loop filters may be applied on an LCU-by-LCU basis and the final filtered reference picture data is provided to the storage component 512. In some embodiments, the ALF component 520 is not present.

Figure 6:
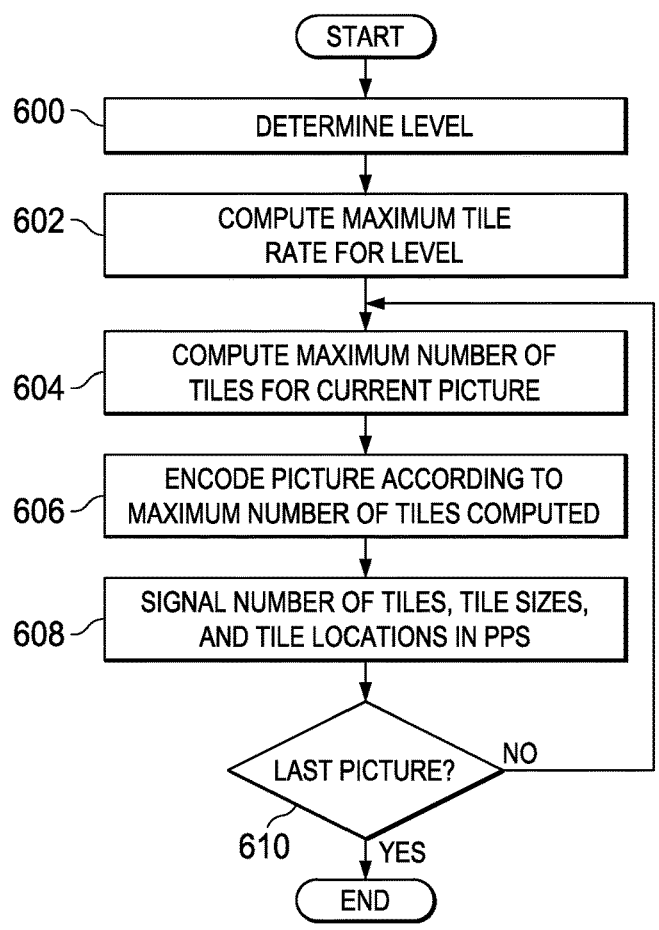
FIGS. 6 and 7 are flow diagrams of methods.

FIG. 6 is a flow diagram of a method for constraining tile processing overhead during encoding of a video sequence that may be performed, for example, by the encoder of FIGS. 4A and 4B. Initially, the level of the video sequence is determined 600. As previously discussed, an encoder knows the picture size, bit-rate, frame-rate requirements of the incoming video. The encoder may use this information to perform a table lookup in a level table such as that of FIG. 2 to select the minimum level that satisfies the performance needs of the incoming video.

The maximum (worst case) tile rate for the level is then computed 602. Computation of the maximum tile rate for a level is previously described herein. Then, the number of tiles in each picture of the video sequence is constrained to be less than or equal to a maximum number of tiles computed for each picture based on the maximum tile rate. More specifically, for each picture 610, a maximum number of tiles is computed 604 based on the maximum tile rate, and the picture is encoded 606 according to the computed maximum number of tiles, i.e., during the encoding, the number of tiles in the picture is constrained to be less than or equal to the computed maximum number of tiles. Computation of the maximum number of tiles for a picture for either a fixed frame rate or a variable frame rate is previously described herein. After a picture is encoded, information indicating the number of tiles, the tiles sized, and the tile locations in the picture is signaled 608 in the encoded bit stream in a picture parameter set for the picture.

Using the method of FIG. 6, the worst case tile processing overhead remains constant for a level. Taking level 5 in the table of FIG. 2 as an example, the maximum number of tiles allowed in a picture is 110, 27, and 13 for 4k×2K@30, 1080p@120 and 720p@240, respectively, and the worst case number of tiles per second is approximately constant for level 5, i.e., 3300 tiles/sec for 4k×2K@30, 3240 tiles/sec for 1080p@120, and 2130 tiles/sec for 720p@240.

Figure 7:
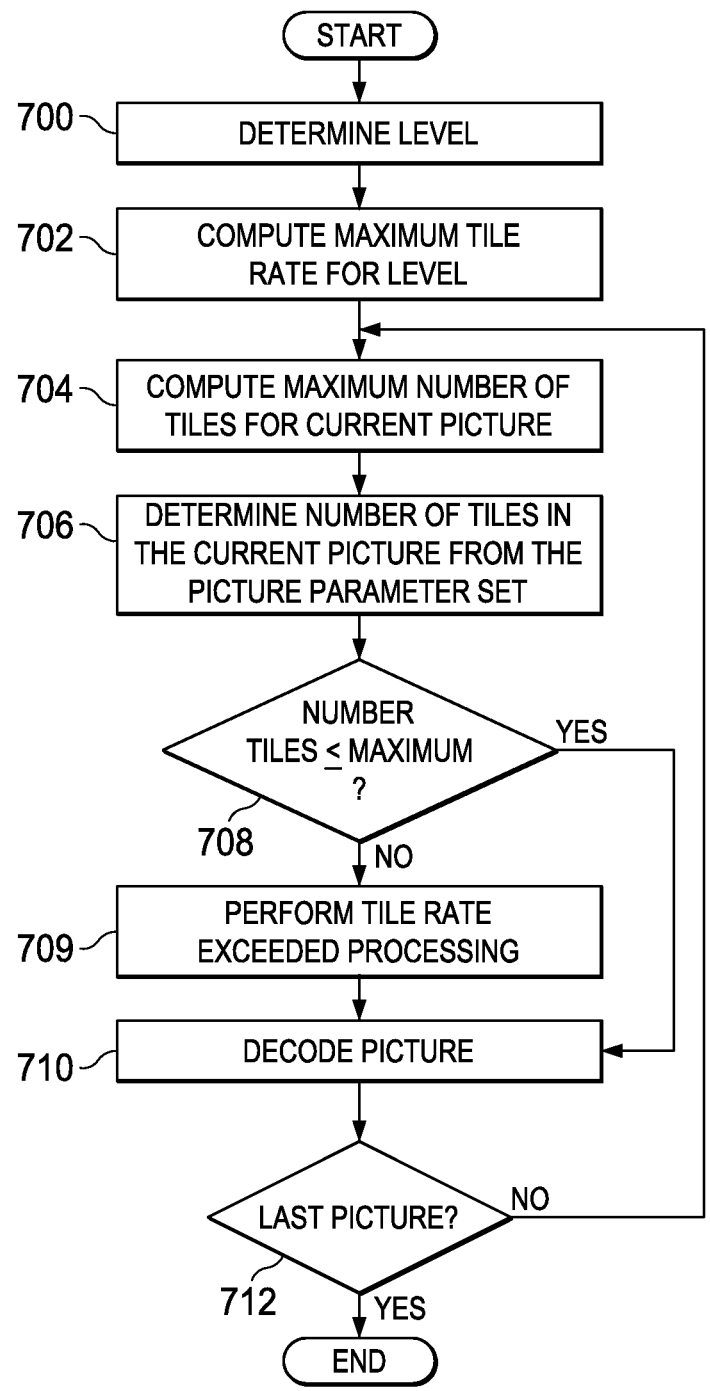

FIG. 7 is a flow diagram of method for verifying that tile processing overhead is constrained to a maximum tile rate during decoding of a compressed video bit stream that may be performed, for example, by the decoder of FIG. 5. Initially, the level of the compressed bit stream is determined 700 by decoding an indication of the level from the bit stream. The maximum (worst case) tile rate for the level is then computed 702. Computation of the maximum tile rate for a level is performed in the same manner as in the encoder and is previously described herein. Then, the number of tiles in each picture encoded in the bit stream is determined from information in the picture parameter sets of each picture and the number of tiles is verified against a maximum number of tiles computed for each picture based on the maximum tile rate. More specifically, for each picture 712, a maximum number of tiles is computed 704 based on the maximum tile rate and the number of tiles in the picture is determined 706 from the picture parameter set of the picture. Computation of the maximum number of tiles for a picture for either a fixed frame rate or a variable frame rate is previously described herein.

If the number of tiles in the picture is less than or equal to 708 the computed maximum number of tiles, the picture is decoded 710, and processing continues with the next picture, if any 712, in the compressed bit stream. Otherwise, the number of tiles in the picture exceeds the maximum number. In such a case, any suitable processing may be performed 709 to compensate for exceeding the maximum tile rate. For example, the decoding of a few tiles or pictures may be skipped to meet real-time decoding requirements. Once the tile rate exceeded processing is complete, processing continues with the next picture, if any 712.

FIG. 9 is a block diagram of an example digital system suitable for use as an embedded system that may be configured to constrain the tile rate per picture during the encoding process to be less than or equal to a worst case number of tiles per second rate as described herein during encoding of a video stream and/or to verify that the tile rates of pictures are constrained to a maximum tile rate during decoding of an encoded video bit stream as described herein. This example system-on-a-chip (SoC) is representative of one of a family of DaVinci™ Digital Media Processors, available from Texas Instruments, Inc. This SoC is described in more detail in "TMS320DM6467 Digital Media System-on-Chip", SPRS403G, December 2007 or later, which is incorporated by reference herein.

The SoC 900 is a programmable platform designed to meet the processing needs of applications such as video encode/decode/transcode/transrate, video surveillance, video conferencing, set-top box, medical imaging, media server, gaming, digital signage, etc. The SoC 900 provides support for multiple operating systems, multiple user interfaces, and high processing performance through the flexibility of a fully integrated mixed processor solution. The device combines multiple processing cores with shared memory for programmable video and audio processing with a highly-integrated peripheral set on common integrated substrate.

The dual-core architecture of the SoC 900 provides benefits of both DSP and Reduced Instruction Set Computer (RISC) technologies, incorporating a DSP core and an ARM926EJ-S core. The ARM926EJ-S is a 32-bit RISC processor core that performs 32-bit or 16-bit instructions and processes 32-bit, 16-bit, or 8-bit data. The DSP core is a TMS320C64x+TM core with a very-long-instruction-word (VLIW) architecture. In general, the ARM is responsible for configuration and control of the SoC 900, including the DSP Subsystem, the video data conversion engine (VDCE), and a majority of the peripherals and external memories. The switched central resource (SCR) is an interconnect system that provides low-latency connectivity between master peripherals and slave peripherals. The SCR is the decoding, routing, and arbitration logic that enables the connection between multiple masters and slaves that are connected to it.

The SoC 900 also includes application-specific hardware logic, on-chip memory, and additional on-chip peripherals. The peripheral set includes: a configurable video port (Video Port I/F), an Ethernet MAC (EMAC) with a Management Data Input/Output (MDIO) module, a 4-bit transfer/4-bit receive VLYNQ interface, an inter-integrated circuit (I2C) bus interface, multichannel audio serial ports (McASP), general-purpose timers, a watchdog timer, a configurable host port interface (HPI); general-purpose input/output (GPIO) with programmable interrupt/event generation modes, multiplexed with other peripherals, UART interfaces with modem interface signals, pulse width modulators (PWM), an ATA interface, a peripheral component interface (PCI), and external memory interfaces (EMIFA, DDR2). The video port I/F is a receiver and transmitter of video data with two input channels and two output channels that may be configured for standard definition television (SDTV) video data, high definition television (HDTV) video data, and raw video data capture.

As shown in FIG. 9, the SoC 900 includes two high-definition video/imaging coprocessors (HDVICP) and a video data conversion engine (VDCE) to offload many video and image processing tasks from the DSP core. The VDCE supports video frame resizing, anti-aliasing, chrominance signal format conversion, edge padding, color blending, etc. The HDVICP coprocessors are designed to perform computational operations required for video encoding such as motion estimation, motion compensation, intra-prediction, transformation, and quantization. Further, the distinct circuitry in the HDVICP coprocessors that may be used for specific computation operations is designed to operate in a pipeline fashion under the control of the ARM subsystem and/or the DSP subsystem.

As was previously mentioned, the SoC 900 may be configured to constrain the tile rate per picture during the encoding process to be less than or equal to a worst case number of tiles per second rate as described herein during encoding of a video stream and/or to verify that the tile rates of pictures are constrained to a maximum tile rate during decoding of an encoded video bit stream as described herein. For example, the coding control of the video encoder of FIGS. 4A and 4B may be executed on the DSP subsystem or the ARM subsystem and at least some of the computational operations of the block processing, including the intra-prediction and inter-prediction of mode selection, transformation, quantization, and entropy encoding may be executed on the HDVICP coprocessors. Similarly, at least some of the computational operations of the various components of the video decoder of FIG. 5, including entropy decoding, inverse quantization, inverse transformation, intra-prediction, and motion compensation may be executed on the HDVICP coprocessors.

Other Embodiments

While the invention has been described with respect to a limited number of embodiments, those skilled in the art, having benefit of this disclosure, will appreciate that other embodiments can be devised which do not depart from the scope of the invention as disclosed herein.

For example, embodiments have been described herein in which the maximum number of tiles in a picture is computed as the minimum of the maximum number of tiles specified for a level and a number of tiles computed based on the maximum tile rate. One of ordinary skill in the art will understand embodiments in which rather than setting the maximum number of tiles for a picture as the minimum of the two tile counts, the maximum number of tiles per picture is set to the number of tiles computed based on the maximum tile rate, i.e., to MaxTileRate/FrameRate for fixed frame rate pictures and MaxTileRate*(t(n)−t(n−1) for variable frame rate pictures.

In another example, embodiments have been described herein in which the maximum number of tiles for a picture is dependent on the frame rate. One of ordinary skill in the art will understand embodiments in which the maximum number of tiles may be computed independent of the frame rate given the luma picture size of a picture. In such embodiments, the maximum number of tiles for a picture may be computed as $$\text{MaxTileCols}*\text{MaxTileRows}*\text{PicSizeInSamplesY}/\text{MaxLumaPS}$$

where MaxTileCols, MaxTileRows, and MaxLumaPS are previously defined herein. For a level, PicSizeInSamplesY may be determined as the product of the height and width of a luma picture and is always less than or equal to MaxLumaPS.

Embodiments of the methods, encoders, and decoders described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

Although method steps may be presented and described herein in a sequential fashion, one or more of the steps shown in the figures and described herein may be performed concurrently, may be combined, and/or may be performed in a different order than the order shown in the figures and/or described herein. Accordingly, embodiments should not be considered limited to the specific ordering of steps shown in the figures and/or described herein.

It is therefore contemplated that the appended claims will cover any such modifications of the embodiments as fall within the true scope of the invention.

What is claimed is:

1. A method for encoding a picture of a video sequence in a bit stream, the method comprising:
   determining, by one or more processors, a level for the video sequence, wherein the level specifies values for MaxLumaSR, MaxLumaPS, MaxTileCols, and MaxTileRows
   computing, by the one or more processor circuits, a maximum tile rate for the video sequence;
   setting, by the one or more processor circuits, a value of a maximum number of tiles for the picture as a minimum of (a) a maximum number of tiles per picture specified for the video sequence and (b) the maximum tile rate divided by a frame rate of the video sequence, wherein the maximum number of tiles per picture is specified independently of the maximum tile rate divided by the frame rate; and
   encoding, by the one or more processor circuits, the picture wherein a number of tiles used to encode the picture is enforced to be no more than the value of the maximum number of tiles.

2. A method comprising:
   decoding, one or more processors, a bitstream such that a removal time of access unit 0 satisfies the following constraint:
   the number of tiles in picture 0 is less than or equal to a minimum value of a first value and a second value,
   the first value being a function of a sum of a third value and a fourth value,
   the third value being a function of $MaxTileCols*MaxTileRows*(t_r(0)-t_{r,n}(0))$,
   the fourth value being equal to
   $$MaxTileCols*MaxTileRows*PicSizeInSamplesY/MaxLumaPS,$$
   the second value being equal to $MaxTileCols*MaxTileRows$,
   where MaxTileCols, MaxTileRows, and MaxLumaPS are specified values that apply to picture 0, and where:
   MaxTileCols represents a maximum number of tile columns,
   MaxTileRows represents a maximum number of tile rows,
   MaxLumaPS represents a maximum luma picture size,
   $t_r(0)$ represents the removal time of access unit 0, and
   $t_{r,n}(0)$ represents a nominal removal time of access unit 0,
   the method further comprising:
   displaying, by a display, video data obtained from the decoded bitstream.

3. The method of claim 2, wherein the third value is equal to:
   $$MaxTileCols*MaxTileRows*K*(t_r(0)-t_{r,n}(0)).$$

4. The method of claim 3, wherein the third value is equal to:
   wherein K=120.

5. The method of claim 3, wherein K=MaxLumaSR/MaxLumaPS, where MaxLumaSR is a maximum luma sample rate.

6. A device comprising:
   one or more processors configured to decode a bitstream such that a removal time of access unit 0 satisfies the following constraint:
   the number of tiles in picture 0 is less than or equal to a minimum value of a first value and a second value,
   the first value being a function of a sum of a third value and a fourth value,
   the third value being a function of $MaxTileCols*MaxTileRows*(t_r(0)-t_{r,n}(0))$,
   the fourth value being equal to
   $$MaxTileCols*MaxTileRows*PicSizeInSamplesY/MaxLumaPS,$$
   the second value being equal to $MaxTileCols*MaxTileRows$,
   where MaxTileCols, MaxTileRows, and MaxLumaPS are specified values that apply to picture 0, and where:
   MaxTileCols represents a maximum number of tile columns,
   MaxTileRows represents a maximum number of tile rows,
   MaxLumaPS represents a maximum luma picture size,
   $t_r(0)$ represents the removal time of access unit 0, and
   $t_{r,n}(0)$ represents a nominal removal time of access unit 0,
   the method further comprising:
   a display configured to display video data obtained from the decoded bitstream.

7. The device of claim 6, wherein the third value is equal to:
   $$MaxTileCols*MaxTileRows*K*(t_r(0)-t_{r,n}(0)).$$

8. The device of claim 7, wherein the third value is equal to:
   wherein K=120.

9. The device of claim 7, wherein K=MaxLumaSR/MaxLumaPS, where MaxLumaSR is a maximum luma sample rate.

10. A method comprising:
    decoding, by one or more processors, a bitstream based on a removal time of access unit 0, wherein the removal time of access unit 0 satisfies the following constraint:
    the number of tiles in picture 0 is less than or equal to a minimum value of a first value and a second value,
    the first value being a function of a sum of a third value and a fourth value,
    the third value being a function of $MaxTileCols*MaxTileRows*(t_r(0)-t_{r,n}(0))$,
    the fourth value being equal to
    $$MaxTileCols*MaxTileRows*PicSizeInSamplesY/MaxLumaPS,$$
    the second value being equal to $MaxTileCols*MaxTileRows$,
    where MaxTileCols, MaxTileRows, and MaxLumaPS are specified values that apply to picture 0, and where:
    MaxTileCols represents a maximum number of tile columns,
    MaxTileRows represents a maximum number of tile rows,
    MaxLumaPS represents a maximum luma picture size,
    $t_r(0)$ represents the removal time of access unit 0, and
    $t_{r,n}(0)$ represents a nominal removal time of access unit 0,
    the method further comprising:

displaying, by a display, video data obtained from the decoded bitstream.

11. The method of claim 10, wherein the third value is equal to:

MaxTileCols*MaxTileRows*K*($t_r(0)-t_{r,n}(0)$).

12. The method of claim 11, wherein the third value is equal to:

wherein K=120.

13. The method of claim 11, wherein K=MaxLumaSR/MaxLumaPS, where MaxLumaSR is a maximum luma sample rate.

14. A device comprising:
one or more processors configured to decode a bitstream based on a removal time of access unit 0, wherein the removal time of access unit 0 satisfies the following constraint:
the number of tiles in picture 0 is less than or equal to a minimum value of a first value and a second value,
the first value being a function of a sum of a third value and a fourth value,
the third value being a function of MaxTileCols*MaxTileRows*($t_r(0)-t_{r,n}(0)$),
the fourth value being equal to MaxTileCols*MaxTileRows*PicSizeInSamplesY/MaxLumaPS, the second value being equal to MaxTileCols*MaxTileRows,
where MaxTileCols, MaxTileRows, and MaxLumaPS are specified values that apply to picture 0, and where:
MaxTileCols represents a maximum number of tile columns,
MaxTileRows represents a maximum number of tile rows,
MaxLumaPS represents a maximum luma picture size,
$t_r(0)$ represents the removal time of access unit 0, and
$t_{r,n}(0)$ represents a nominal removal time of access unit 0,
the method further comprising:
a display configured to display video data obtained from the decoded bitstream.

15. The device of claim 14, wherein the third value is equal to:

MaxTileCols*MaxTileRows*$K$*($t_r(0)-t_{r,n}(0)$).

16. The device of claim 15, wherein the third value is equal to:
wherein K=120.

17. The device of claim 15, wherein K=MaxLumaSR/MaxLumaPS, where MaxLumaSR is a maximum luma sample rate.

18. A method comprising:
decoding, by one or more processors, a bitstream that is encoded based on a removal time of access unit 0 satisfying the following constraint:
the number of tiles in picture 0 is less than or equal to a minimum value of a first value and a second value,
the first value being a function of a sum of a third value and a fourth value,
the third value being a function of MaxTileCols*MaxTileRows*($t_r(0)-t_{r,n}(0)$),
the fourth value being equal to MaxTileCols*MaxTileRows*PicSizeInSamplesY/MaxLumaPS, the second value being equal to MaxTileCols*MaxTileRows,
where MaxTileCols, MaxTileRows, and MaxLumaPS are specified values that apply to picture 0, and where:
MaxTileCols represents a maximum number of tile columns,
MaxTileRows represents a maximum number of tile rows,
MaxLumaPS represents a maximum luma picture size,
$t_r(0)$ represents the removal time of access unit 0, and
$t_{r,n}(0)$ represents a nominal removal time of access unit 0,
the method further comprising:
displaying, by a display, video data obtained from the decoded bitstream.

19. The method of claim 18, wherein the third value is equal to:

MaxTileCols*MaxTileRows*$K$*($t_r(0)-t_{r,n}(0)$).

20. The method of claim 19, wherein the third value is equal to:
wherein K=120.

21. The method of claim 19, wherein K=MaxLumaSR/MaxLumaPS, where MaxLumaSR is a maximum luma sample rate.

22. A device comprising:
one or more processors configured to decode a bitstream that is encoded based on a removal time of access unit 0 satisfying the following constraint:
the number of tiles in picture 0 is less than or equal to a minimum value of a first value and a second value,
the first value being a function of a sum of a third value and a fourth value,
the third value being a function of MaxTileCols*MaxTileRows*($t_r(0)-t_{r,n}(0)$),
the fourth value being equal to MaxTileCols*MaxTileRows*PicSizeInSamplesY/MaxLumaPS, the second value being equal to MaxTileCols*MaxTileRows,
where MaxTileCols, MaxTileRows, and MaxLumaPS are specified values that apply to picture 0, and where:
MaxTileCols represents a maximum number of tile columns,
MaxTileRows represents a maximum number of tile rows,
MaxLumaPS represents a maximum luma picture size,
$t_r(0)$ represents the removal time of access unit 0, and
$t_{r,n}(0)$ represents a nominal removal time of access unit 0,
the method further comprising:
a display configured to display video data obtained from the decoded bitstream.

23. The device of claim 22, wherein the third value is equal to:

MaxTileCols*MaxTileRows*$K$*($t_r(0)-t_{r,n}(0)$).

24. The device of claim 23, wherein the third value is equal to:
wherein K=120.

25. The device of claim 23, wherein K=MaxLumaSR/MaxLumaPS, where MaxLumaSR is a maximum luma sample rate.

* * * * *